3,278,405
POLYACRYLONITRILE CONTAINING KETENE-IMINE LINKAGES PRODUCED BY HIGH ENERGY RADIATION
Charles A. Levine, Concord, and Conrad A. Diethelm, Antioch, Calif., assignors to The Dow Chemical Company, Midland, Mich., a corporation of Delaware
Filed May 2, 1962, Ser. No. 191,764
6 Claims. (Cl. 204—159.22)

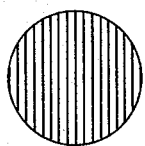
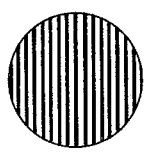
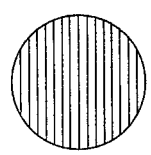
Fig. 1    Fig. 2    Fig. 3    Fig. 4
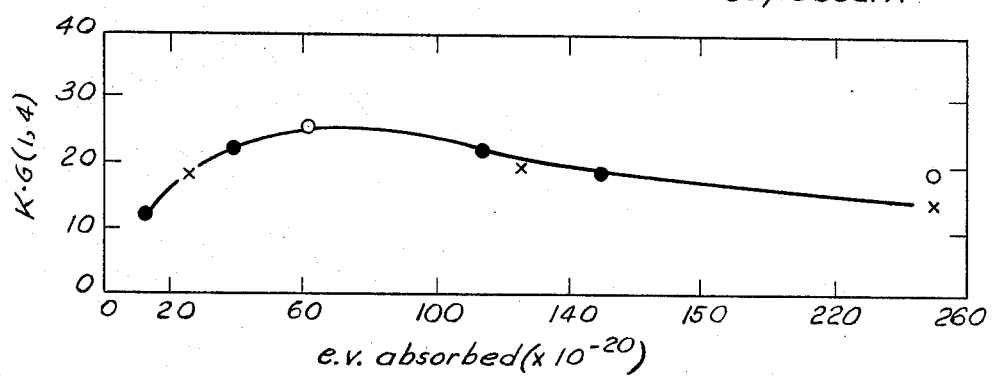
Fig. 5

The present invention relates to an improved method for preparing extremely advantageous and highly desirable polymers of acrylonitrile containing substantial numbers of ketene-imine linkages. More specifically, this invention relates to a method for the preparation of acrylonitrile polymers, under the influence of high energy radiation, wherein an appreciable amount of monomer addition occurs through the 1,4 positions, i.e.

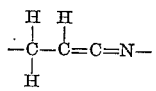

rather than solely through the usual 1,2 positions, i.e.

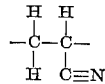

It is the principal object of the present invention to provide an improved method for producing polyacrylonitrile characterized by the interposition of numerous ketene-imine linkages in the usual 1,2 linear addition chain structure.

It is a further object of this invention to provide a method for preparing an acrylonitrile polymer which is capable of forming products with highly advantageous properties as a consequence of its chemical reactivity at numerous ketent-imine sites within the linear polymer chain.

Another object of the invention is to provide improved dye reception and retention qualities in polyacrylonitrile films, fibers, filaments and cognate structures through incorporation of ketene-imine linkages in the polymeric product.

The foregoing objects are achieved by the utilization of high energy radiation for effecting substantial 1,4 monomer addition during the polymerization of acrylonitrile.

Further objects and attendant advantages of the present invention will become apparent after consideration of the ensuing description and specification.

The method of the present invention comprises irradiation of acrylonitrile monomer, hereinafter referred to as VCN, either as a liquid or as a solute in a suitable solvent, with high energy particles or high energy electromagnetic radiation under controlled conditions. Temperatures, dose rates and total dosages are experimentally determined to produce a polymerization product of desired molecular weight and ketene-imine linkage content. An alternative method additionally includes the use of certain additives which influence the molecular weight and the relative amount of chain propagation through the 1,4 and 1,2 positions.

A radiation source emitting high energy radiation, such as X-rays, gamma rays, or charged particles, is employed in the method of this invention. The results reported in the following discussion refer to the use of high energy electrons or high energy X-rays.

Figure 6:
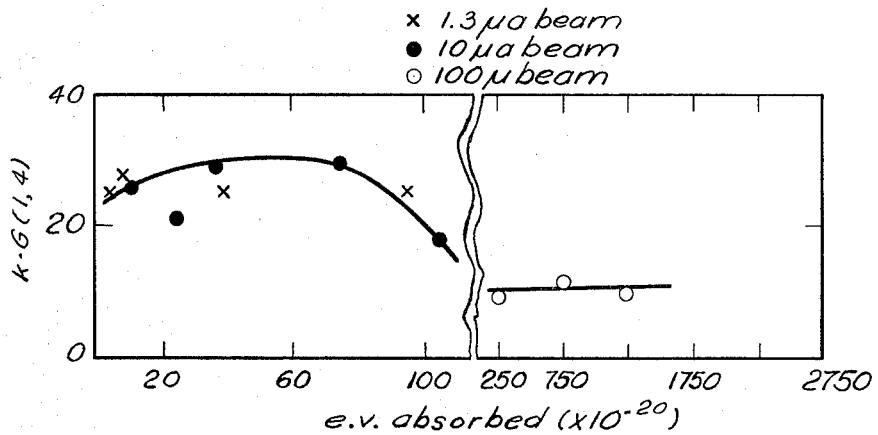
Figure 7:
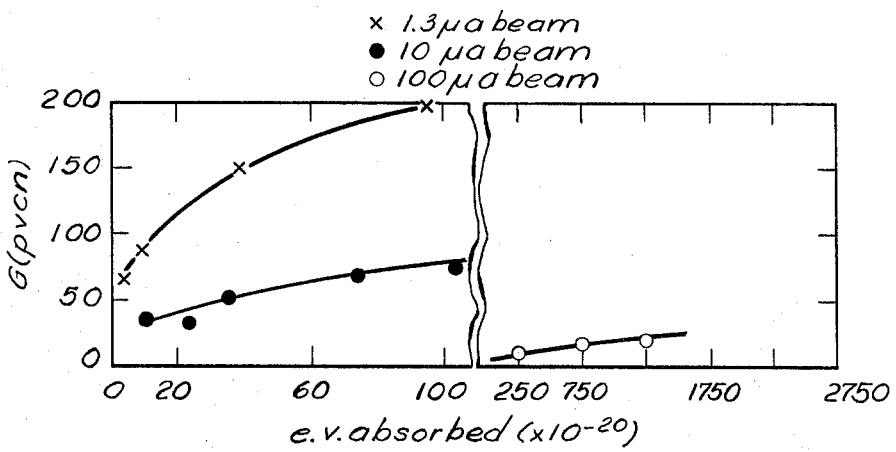

Some effects of total dose and dose rate on the 1,4 polymerization of VCN, both in bulk and in water solution, using high energy electrons, are shown in FIGURES 5 and 6. The same effects on the total polymer yield are shown in FIGURE 7. In these figures, yield on the ordinate is plotted against electron volts absorbed per gram of material on the abscissa. The ordinate value G ($pvcn$) is a measure of the number of molecules of VCN that polymerize per 100 e.v. of absorbed energy and G (1,4) refers to the number of molecules of VCN which polymerize in the 1,4 mode per 100 e.v. of absorbed energy. The constant K is the inverse of the ratio of the absorption coefficients for the $4.9\mu$ line from $>C=C=N-$ to the coefficients for the $4.5\mu$ line of $-C\equiv N$ in the infrared region. Electron beams of varying intensity from 1.3 to 150 microamps are shown. (A one microamp beam current is equivalent to a 0.2 megarad/sec. dose rate on a one gram sample, i.e., 0.2 megarad/sec./g., where one megarad is defined as $10^8$ ergs of energy absorbed per gram of material.) While the 1,4 polymerization is generally independent of the dose rate, as shown by the fact that yields obtained from widely varying beam currents are plotted on the same curves, a beam current such that a density of greater than $2\times10^{11}$ e.$^-$/sec./cm.$^2$ is obtained is considered operable, and a minimum of ten times that, or of about 1 microamp under our conditions, is preferred.

FIGURES 5 and 6 show an optimum yield at about $60\times10^{20}$ electron volts total dose for a 16 gram sample or about $4\times10^{20}$ electron volts per gram which is equivalent to 6.4 megarads.

It is difficult to assign operable and preferred ranges to the total radiation dose. The yield of polymer may well be more or less linearly dependent on total dose in low dose ranges. Appreciable yields have been shown at doses of $78\times10^{20}$ e.v./g. (see FIGURES 6 and 7) or over 130 megarads, which therefore are less than an operable maximum.

As is evident from FIGURES 5, 6 and 7, the total amount of polyacrylonitrile formed per unit of energy input is a definite function of dose rate and total dose. The 1,2 polymerization of VCN is most efficient at low dose rates. On the other hand, surprising as it may seem, the yield of 1,4 linkages is not a function of dose rate and total dose. Thus, the final product at a given total dose will contain more 1,4 linkages if the higher dose rates are used. To the contrary, ketene-imine linkage concentration in the product polymer is smaller at low dose rates.

In the experimental work illustrated, the dose rate was varied using electron dose rates from 0.0043 megarad/sec. to 1.7 megarads/sec. while the estimated dose rate, using 40 KVP X-rays, was 0.028 megarad/sec. The dose rate maxima are primarily determined by the characteristics of the radiation source. A dose rate between about 10 and about 7000 megarads per hour, continued until a total dose greater than about 0.5 megarad has been effected, is employed in the method of the present invention. A dose rate between 4000 and 7000 megarads per hour, until a total dose of greater than 2 megarads has been effected, is advantageously employed to form an acrylonitrile polymer containing from about 2 to about 20 percent of ketene-imine linkages in the polymer structure.

The yield of 1,4 linkages is independent of temperature, at least in temperature ranges of practical interest (i.e., between about $-78°$ C. to about $25°$ C.), in the case of irradiation of bulk monomer. The same applies (as based on actual evidence in the range between about $18°$ C. and about $51°$ C.) when the monomer is dissolved in, and polymerized from, water.

Increasing the temperature of polymerization, however, does increase the molecular weight and, correspondingly, the amount of regular (i.e. 1,2) linkages. This, then, is a factor with regard to the relative proportion of 1,4 linkages in the polymer product. In general, the 1,2 addition has a small activation energy while the 1,4 addition has a lower activation energy quite close to zero. In view of the foregoing, the acrylonitrile monomer is maintained at a temperature of from about −150° to about 50° C. during irradiation in accordance with the method of the present invention.

As previously stated, the polymerization may be carried out by irradiating VCN either in bulk or in solution. As shown in FIGURES 5 and 6, the yield of 1,4 polymer is practically the same whether precipitated from bulk VCN or from a 7.4 weight percent solution of VCN in water.

Various procedures were investigated in an attempt to increase the yield of ketene-imine linkages and to modify or eliminate the initial inhibition period shown in FIGURES 5 and 6. Purification of the VCN monomer, as by distillation, to eliminate oxygen generally results in an increase of both 1,4 and 1,2 addition but does not affect the initial inhibition period. A simple distillation proves as effective as rigorous purification of the monomer, as in several passes of the VCN through a gas phase chromatographic column.

Surprisingly, the effect of oxygen on the polymer made from water solution of the monomer is negligible. Within experimental error, the same total yields of polyacrylonitrile containing the same concentrations of 1,4 linkages are obtained whether the polymerization is carried out in air, after one hour of bubbling nitrogen through the solution, or after thorough degassing by a freeze-thaw technique.

The use of solvents other than water generally results in various side effects, such as lowering the molecular weight of the product or changing the ratio of 1,4:1,2 addition. Ethyl acetate (such as in a composition of 24 ml. EtOAc plus 16 ml. VCN) tends to lower the molecular weight of the product and cause the amount of 1,2 polymerization to drop by as much as a third, while not affecting the total amount of 1,4 addition.

No detectable ketene-imine linkages result when methylene dichloride( as in a composition of 90 ml. methylene dichloride plus 10 ml. VCN) is used as a solvent. Hexane (as in a composition of 50 ml. hexane plus 50 ml. VCN) also has no apparent effect on the amount of 1,4 addition but seems to decrease both 1,2 addition and the polymer molecular weight. Solutions in dioxane (as in a composition of 55 ml. dioxane plus 5 ml. VCN); pyridine (as in a composition of 55 ml. pyridine plus 5 ml. VCN); acetone (as in a composition of 55 ml. acetone plus 5 ml. VCN); ethanol (as in a composition of 90 ml. ethanol plus 10 ml. VCN); and methanol (as in a composition of 90 ml. methanol plus 10 ml. VCN) generally yield negligible amounts of polymer.

The addition of certain organic or inorganic compounds to the monomer or monomer-solvent system before irradiation also results in changes in the polymer product. For example, the addition of up to about 25 percent EtOAc, e.g. approximately 1 part by weight of EtOAc per 3 parts of VCN, prior to irradiation of either bulk VCN or aqueous VCN solutions greatly increases the percentage of ketene-imine linkages in the final polymer product.

The hydrolysis of VCN polymer containing ketene-imine linkages is slow at room temperature and a pH of 4.5 but becomes extremely rapid upon the addition of dilute acid. This hydrolysis, as illustrated by the following equation,

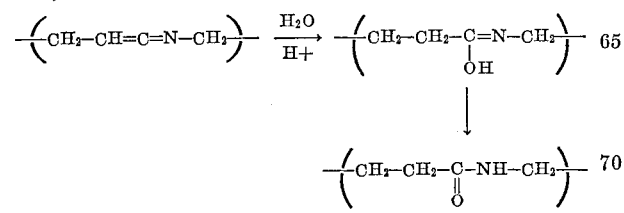

is extremely advantageous for purposes of producing a polyacrylonitrile with greatly enhanced dye receptive qualities which may be formed into films, fibers, filaments and cognate structures by conventional means well known to the art.

Experiments on various samples of VCN polymers demonstrated that treatment with boiling aqueous solutions of Calcodur Pink 2BL resulted in essentially no dye pick-up by those samples containing no detectable ketene-imine linkages, even when previously treated for five minutes with 0.1 N HCl. In contrast, samples containing about two percent ketene-imine linkages showed moderate dye pick-up without prior hydrolysis of the polymer and intense dye pick-up when treated with 0.1 N HCl for five minutes prior to immersion in the dye solution.

The dyed samples were subjected to three separate scourings with warm water. Dye retention was demonstrated by the lack of detectable color in the final wash water. These samples are represented by FIGURES 1, 2, 3 and 4, wherein the relative intensity of dye pick-up and retention is shown by comparative shading. FIGURE 1 represents a sample of acrylonitrile homopolymer, containing approximately 2 percent ketene-imine linkages, which was hydrolyzed by treatment with 0.1 N HCl for five minutes prior to dyeing while FIGURE 3 represents a similar sample which was not hydrolyzed. FIGURES 2 and 4 represent samples which contained no detectable ketene-imine linkages and differ only in that FIGURE 2 was treated for five minutes with 0.1 N HCl prior to dyeing.

The stability of the 1,4 linkages in the polymer is sufficient, under ordinary conditions, to permit product isolation and storage for future use in preparation of specific products possessing desirable properties quite different from those of polyacrylonitrile resulting from exclusively 1,2 monomer addition.

The presence of the ketene-imine structure in polyacrylonitrile, prepared by the practice of the present invention, is demonstrable by means of identification of the products resulting from strong hydrolysis of the polymer. Under mild hydrolysis conditions ketene-imine will yield a monosubstituted amide whereas the presence of two or more acrylonitrile monomer units which have reacted 1,4 to yield adjacent ketene-imine groups will, under strong hydrolysis conditions, yield β-alanine. Infrared analysis of samples of polyacrylonitrile prepared by the methods of the present invention and hydrolyzed by both acid and basic techniques confirmed the presence of β-alanine.

The ketene-imine linkage is also identifiable by its sharp infrared absorption peak at 2030 cm.$^{-1}$. Such analysis of the products of the present invention showed maximum ketene-imine linkage content of about 20 percent of the total monomer addition at a dose rate of about 6120 megarads/hr. utilizing ethyl acetate as an additive to a 7.4 percent VCN in water solution prior to irradiation.

We claim:

1. A method of preparing polyacrylonitrile with improved dyeability which comprises exposing acrylonitrile monomer at a temperature from about −150° to about 50° C. to a field of high energy radiation whereby said monomer is given a high energy dose at a rate between about 10 and about 7000 megarads per hour until a total dose greater than about 0.5 megarad has been effected and an acrylonitrile polymer has been formed containing ketene-imine linkages in the polymer structure.

2. The method of claim 1, wherein the acrylonitrile monomer is in bulk form and the temperature is from about −78° to 25° C.

3. The method of claim 1, wherein the acrylonitrile monomer is in aqueous solution and the temperature is from about 18° to 51° C.

4. The method of claim 1, wherein the acrylonitrile monomer is in aqueous solution and including the additional step of incorporating in said solution a minor proportion up to about 25 percent by weight, based on the total weight of said solution, of ethyl acetate.

5. The method of claim 1, wherein said monomer is exposed to said field of high energy radiation at a dose rate between about 4,000 and 7,000 megarads per hour until a total dosage of greater than about 2 megarads has been effected and an acrylonitrile polymer has been formed containing from about 2 to about 20 percent of ketene-imine linkages in the polymer structure.

6. In the method of preparing polyacrylonitrile with improved dyeability containing ketene-imine linkages in the linear polymer chain, by exposure of acrylonitrile monomer in bulk form at a temperature from about $-150°$ to about $50°$ C. to high energy radiation, whereby said monomer is given a high energy dose at a rate between about 10 and 7000 megarads per hour until a total dose greater than about 0.5 megarad has been effected, the improvement which consists of irradiation of acrylonitrile monomer containing a minor proportion of ethyl acetate in the amount of up to about 25 percent by weight based on the total weight of monomer and ethyl acetate.

References Cited by the Examiner

UNITED STATES PATENTS 2,803,599   8/1957   Tutwiler et al. _____ 204—154

OTHER REFERENCES

Dainton: Nature, vol. 160, Aug. 23, 1947, page 268.

Grassie et al.: J. Polymer Science, vol. 33, pages 171–182 (1958).

Arthur et al.: J. Phys. Chem., vol. 64, page 1332 (1960).

Charlesby: International Series of Monographs on Radiation Effects in Materials, published by Pergamon Press (New York) 1960, page 387.

JOSEPH L. SCHOFER, *Primary Examiner.*

JOSEPH R. LIBERMAN, *Examiner.*

H. WONG, *Assistant Examiner.*